US012795740B2

(12) United States Patent
Abotabl et al.

(10) Patent No.: US 12,795,740 B2
(45) Date of Patent: Nov. 10, 2026

(54) ASSOCIATION PERIOD BASED PRACH ADAPTATION AND ACTIVATION

(71) Applicant: QUALCOMM Incorporated, San Diego, CA (US)

(72) Inventors: Ahmed Attia Abotabl, San Diego, CA (US); Hung Dinh Ly, San Diego, CA (US); Navid Abedini, Basking Ridge, NJ (US); Aria Hasanzadezonuzy, Jersey City, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 280 days.

(21) Appl. No.: 18/627,801

(22) Filed: Apr. 5, 2024

(65) Prior Publication Data

US 2025/0317978 A1 Oct. 9, 2025

(51) Int. Cl.
*H04W 74/0833* (2024.01)
*H04W 24/08* (2009.01)
*H04W 74/08* (2024.01)

(52) U.S. Cl.
CPC ....... *H04W 74/0833* (2013.01); *H04W 24/08* (2013.01); *H04W 74/0891* (2013.01)

(58) Field of Classification Search
CPC ............. H04W 74/0833; H04W 24/08; H04W 74/0891; H04W 74/0816; H04W 74/006
See application file for complete search history.

(56) References Cited

U.S. PATENT DOCUMENTS 10,750,460 B2 * 8/2020 Huang ................ H04W 56/001
11,272,544 B2 * 3/2022 Xiong ................. H04W 56/001
2022/0304047 A1 * 9/2022 Zhang ............... H04W 74/0833
2022/0330348 A1 * 10/2022 Wei ..................... H04W 74/006
(Continued)

FOREIGN PATENT DOCUMENTS

CN R1-2402573 * 4/2024
EP 4346317 * 8/2021

OTHER PUBLICATIONS

Classon B (Futurewei)., et al., "Discussion of the Adaptation of Common Signal/channel Transmissions", 3GPP TSG RAN WG1 #116, R1-2400099, Type Discussion, NETW_Energy_NR_ENH-Core, 3rd Generation Partnership Project (3GPP), Mobile Competence Centre, 650, Route Des Lucioles, F-06921 Sophia-Antipolis Cedex, France, vol. RAN WG1, No. Athens, GR, Feb. 26, 2024-Mar. 1, 2024, Feb. 16, 2024, XP052567885, 8 Pages, .3.1, .3.2.
(Continued)

*Primary Examiner* — Abdullahi E Salad
(74) *Attorney, Agent, or Firm* — QUALCOMM Incorporated

(57) ABSTRACT

Certain aspects of the present disclosure provide techniques for association period based physical random access channel (PRACH) adaptation and activation. An example method, performed at a user equipment (UE), generally includes receiving signaling indicating adaptation of a first set of one or more random access channel (RACH) occasions (ROs), wherein the adaptation results in a second set of one or more ROs, determining an association period in which each synchronization signal block (SSB), of a set of SSBs, are mapped to at least one RO of the second set of ROs, and transmitting a RACH preamble in an RO of the second set, in accordance with the determined association period.

28 Claims, 15 Drawing Sheets

(56) References Cited

U.S. PATENT DOCUMENTS

| | | | | |
|---|---|---|---|---|
| 2023/0199856 | A1* | 6/2023 | Guo .................. | H04W 74/0833 370/329 |
| 2023/0209606 | A1* | 6/2023 | Zhang ................. | H04W 74/006 370/329 |
| 2023/0397256 | A1* | 12/2023 | Wang ................ | H04W 74/0833 |
| 2024/0397556 | A1* | 11/2024 | Mangalvedhe ..... | H04W 74/006 |

OTHER PUBLICATIONS

International search Report and Written Opinion—PCT/US2025/022314—ISA/EPO—Jul. 9, 2025.

Wang F (CMCC)., et al., "Discussion on Adaptation of Common Signal/channel Transmissions", 3GPP TSG RAN WG1 #116-bis, R1-2402573, Type Discussion, NETW_Energy_NR_ENH-Core, 3rd Generation Partnership Project (3GPP), Mobile Competence Centre, 650, Route Des Lucioles, F-06921 Sophia-Antipolis Cedex, France, vol. RAN WG1, No. Changsha, Hunan Province, CN, Apr. 15, 2024-Apr. 19, 2024, Apr. 3, 2024, XP052586574, 9 Pages, .2.1, .2.3.

* cited by examiner

ASSOCIATION PERIOD BASED PRACH ADAPTATION AND ACTIVATION

FIELD OF THE DISCLOSURE

Aspects of the present disclosure relate to wireless communications, and more particularly, to techniques for association period based physical random access channel (PRACH) adaptation and activation.

DESCRIPTION OF RELATED ART

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users.

Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method for wireless communication at a user equipment (UE). The method includes receiving signaling indicating adaptation of a first set of one or more random access channel (RACH) occasions (ROs), wherein the adaptation results in a second set of one or more ROs; determining an association period in which each synchronization signal block (SSB), of a set of SSBs, are mapped to at least one RO of the second set of ROs; and transmitting a RACH preamble in an RO of the second set, in accordance with the determined association period.

Another aspect provides a method for wireless communication at a network entity. The method includes transmitting signaling indicating adaptation of a first set of one or more random access channel (RACH) occasions (ROs), wherein the adaptation results in a second set of one or more ROs; determining an association period in which each synchronization signal block (SSB), of a set of SSBs, are mapped to at least one RO of the second set of ROs; and monitoring for a RACH preamble in an RO of the second set, in accordance with the determined association period.

Other aspects provide: an apparatus operable, configured, or otherwise adapted to perform any one or more of the aforementioned methods and/or those described elsewhere herein; a non-transitory, computer-readable media comprising instructions that, when executed (e.g., directly, indirectly, after pre-processing, without pre-processing) by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

DETAILED DESCRIPTION

Figure 1:
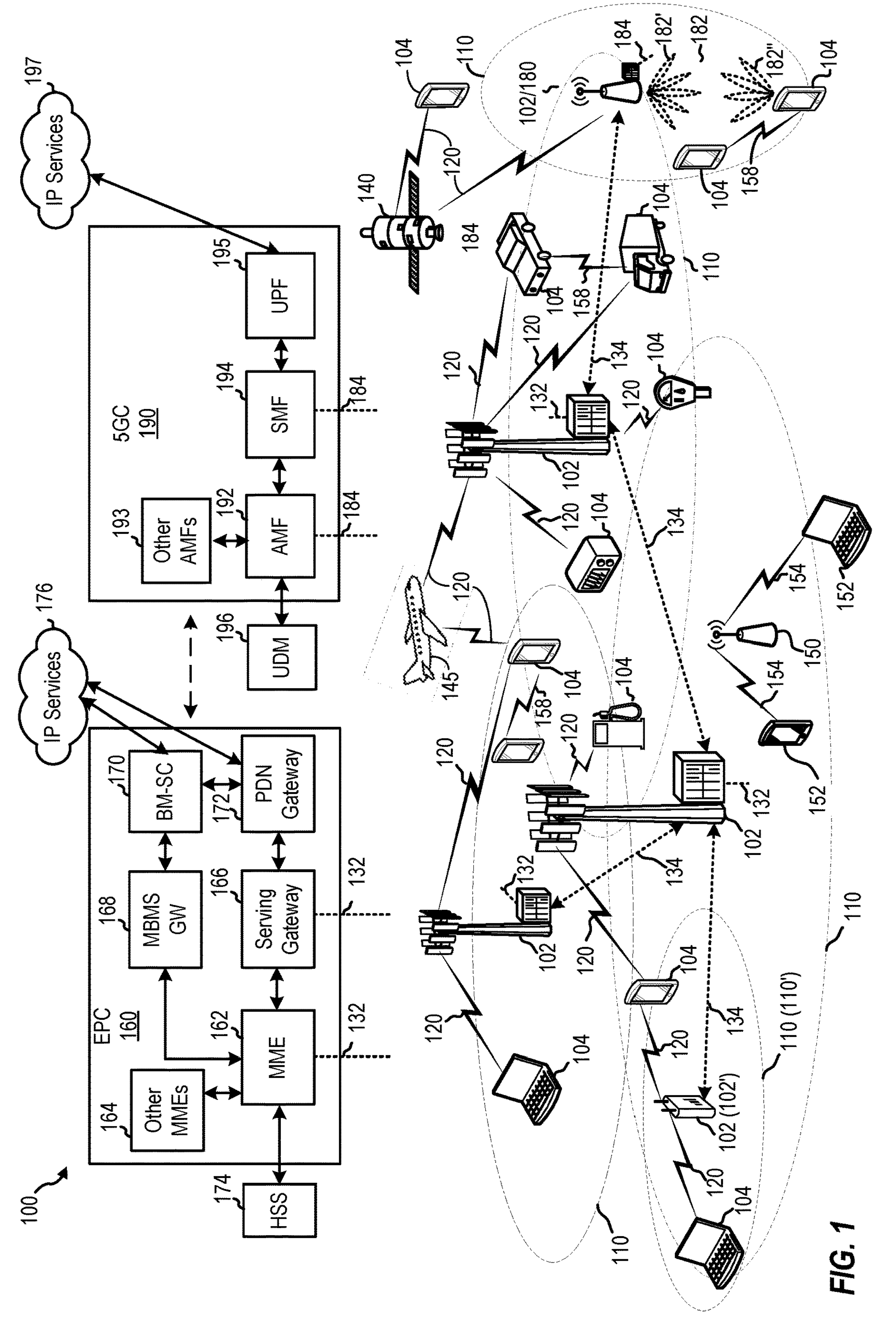
FIG. 1 depicts an example wireless communications network.

Aspects of the present disclosure relate to wireless communications, and more particularly, to techniques for supporting random access channel (RACH) adaptation.

A Physical Random Access Channel (PRACH) generally refers to a channel used by user equipment (UE) to initiate communication with a base station (e.g., a gNB) in a cellular network. For example, as part of a random access (RA) channel procedure, the UE may send a preamble on the PRACH, after detecting a synchronization signal block (SSB) transmitted by the gNB. After successfully decoding a PRACH preamble, the gNB may respond with a Random Access Response (RAR) containing a Temporary Cell Identifier (TCI) and a timing advance (TA) value. The UE uses the TCI and TA to synchronize with the gNB and to access the network.

In PRACH, a random access channel (RACH) occasion (RO) generally refers to a specific time and frequency resource that maps to an SSB. The UE transmits a preamble sequence, from a set of preamble sequences, to initiate a Random Access (RA) procedure. The gNB uses the timing and frequency information associated with the RO to detect and decode the preamble and responds with the RAR.

As energy cost and environmental impact become an increasing concern, various network energy savings (NES) techniques have been considered to reduce power consumption. Some such NES techniques involve adaptation of transmissions and/or receptions in time, frequency, spatial, or power domains. For example, the number or periodicity of SSB transmissions, as well as ROs for corresponding PRACH transmissions, could be adapted in the time domain.

In some cases, PRACH adaptation in time domain may occur in two steps. A first step involves radio resource control (RRC) configuration of extra ROs (e.g., through a separate PRACH configuration index or a different PRACH periodicity). A second step involves activation of the configured extra ROs. The RACH process is typically managed according to an association period, in which a mapping of SSBs to ROs is performed. An association period may defined as a (shortest) period in which each SSB is mapped to at least one RO. One potential challenge with PRACH adaptation is ambiguity in how to determine an association period upon activation of extra ROs. This ambiguity may result in a waste of power consumption (if the network monitors ROs the UE will not use for PRACH transmissions) or the possibility of the network missing a PRACH transmission (if the network does not monitor an RO the UE uses for that PRACH transmission).

Aspects of the present disclosure provide mechanisms that may help remove this ambiguity, for example, by providing a mechanism aimed to ensure the UE and network determine the same association period. Thus, even after PRACH adaptation, the UE may only transmit PRACH preambles on ROs monitored by the network. As a result, the mechanisms proposed herein may help avoid potential wasted power consumption or wasted PRACH transmissions that might occur if the UE and network were not in agreement regarding the association period.

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and user equipments.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
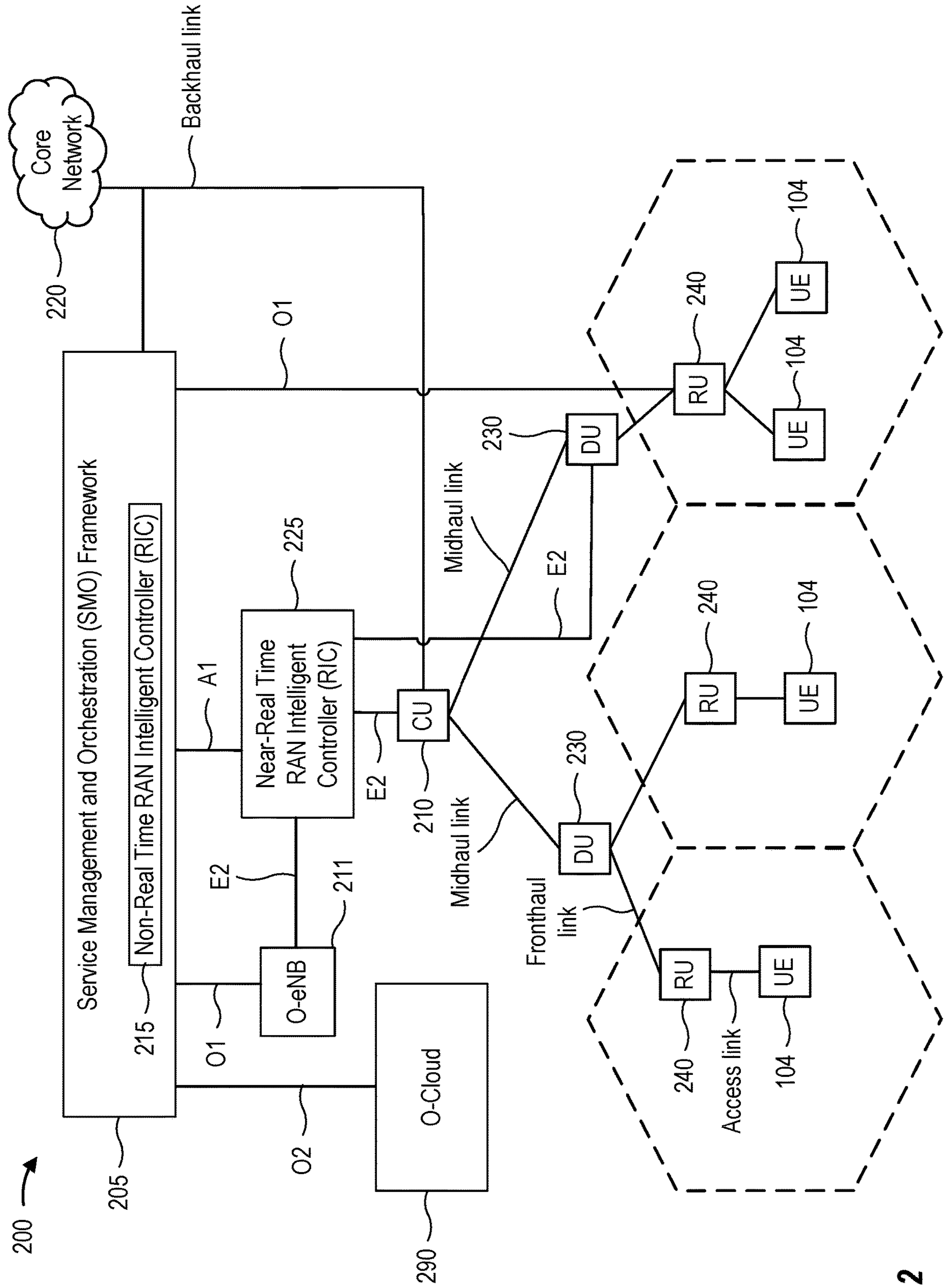
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410 MHz-7125 MHz, which is often referred to (interchangeably) as "Sub-6 GHz". Similarly, 3GPP currently defines Frequency Range 2 (FR2) as including 24,250 MHz-71,000 MHz, which is sometimes referred to (interchangeably) as a "millimeter wave" ("mmW" or "mmWave"). In some cases, FR2 may be further defined in terms of sub-ranges, such as a first sub-range FR2-1 including 24,250 MHz-52,600 MHz and a second sub-range FR2-2 including 52,600 MHz-71,000 MHz. A base station configured to communicate using mmWave/near mmWave radio frequency bands (e.g., a mmWave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QoS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3$^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
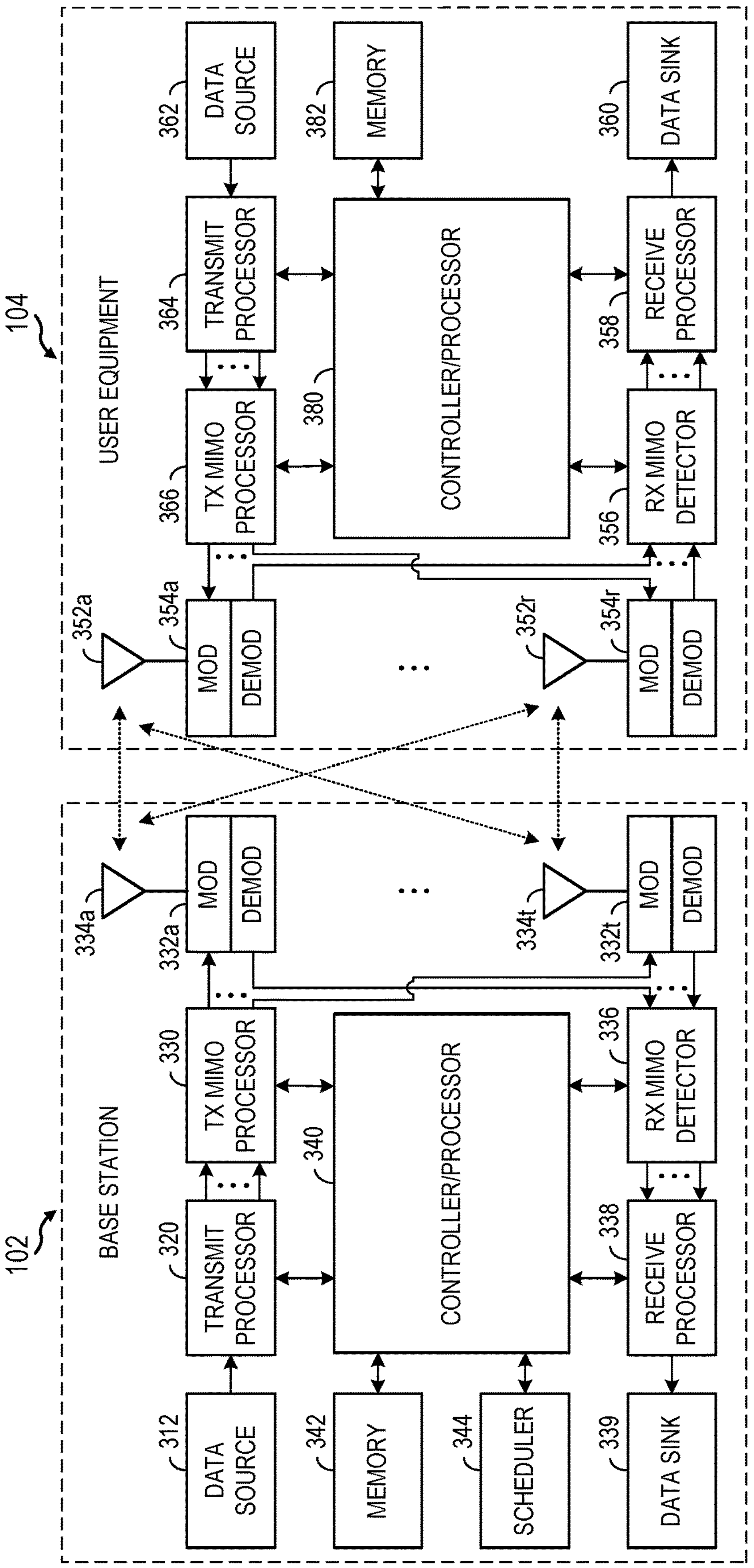
FIG. 3 depicts aspects of an example base station and an example user equipment.

FIG. 3 depicts aspects of an example BS 102 and a UE 104.

Generally, BS 102 includes various processors (e.g., 320, 330, 338, and 340), antennas 334*a-t* (collectively 334), transceivers 332*a-t* (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352*a-r* (collectively 352), transceivers 354*a-r* (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332*a*-332*t*. Each modulator in transceivers 332*a*-332*t* may process a respective output symbol stream to obtain an output sample stream. Each modulator may further process (e.g., convert to analog, amplify, filter, and upconvert) the output sample stream to obtain a downlink signal. Downlink signals from the modulators in transceivers 332*a*-332*t* may be transmitted via the antennas 334*a*-334*t*, respectively.

In order to receive the downlink transmission, UE 104 includes antennas 352*a*-352*r* that may receive the downlink signals from the BS 102 and may provide received signals to the demodulators (DEMODs) in transceivers 354*a*-354*r*, respectively. Each demodulator in transceivers 354*a*-354*r* may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354*a*-354*r*, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354*a*-354*r* (e.g., for SC-FDM), and transmitted to BS 102.

At BS 102, the uplink signals from UE 104 may be received by antennas 334*a-t*, processed by the demodulators in transceivers 332*a*-332*t*, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332*a-t*, antenna 334*a-t*, and/or other aspects described herein. Similarly, "receiving" may refer to various mechanisms of obtaining data, such as obtaining data from antennas 334*a-t*, transceivers 332*a-t*, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354*a-t*, antenna 352*a-t*, and/or other aspects described herein. Similarly, "receiving" may refer to various mechanisms of obtaining data, such as obtaining data from antennas 352*a-t*, transceivers 354*a-t*, RX MIMO detector 356, controller/processor 380, receive processor 358, memory 382, and/or other aspects described herein.

In some aspects, one or more processors may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

Figure 4A:
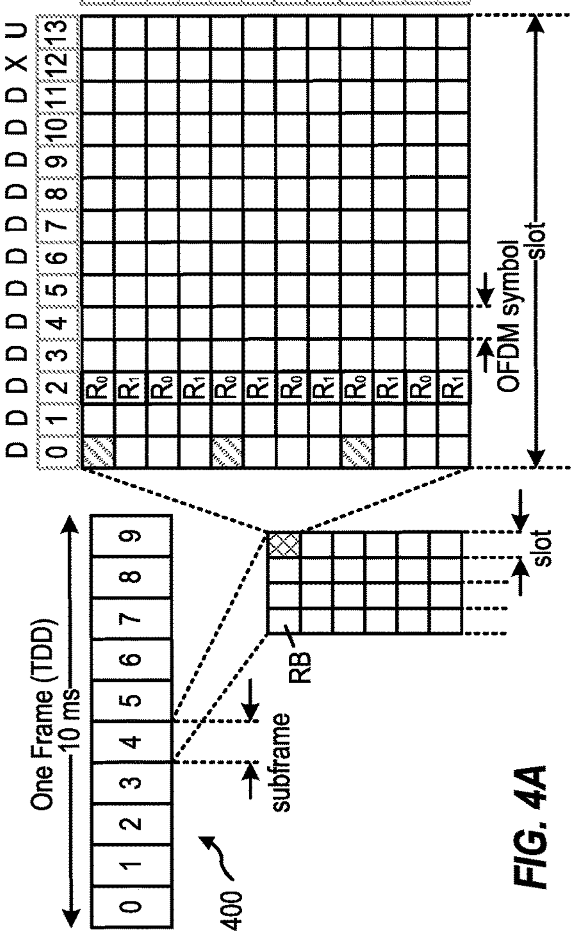
FIGS. 4A, 4B, 4C, and 4D depict various example aspects of data structures for a wireless communications network.
Figure 4B:
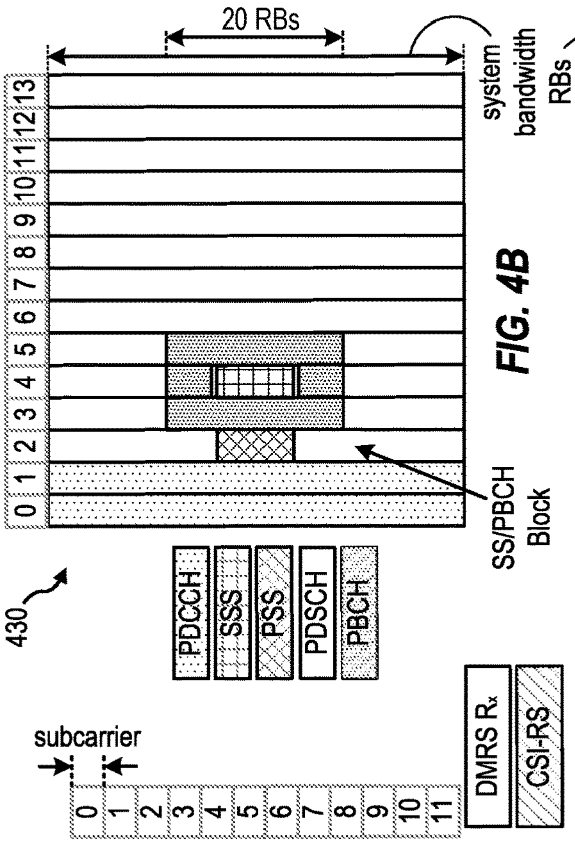
Figure 4C:
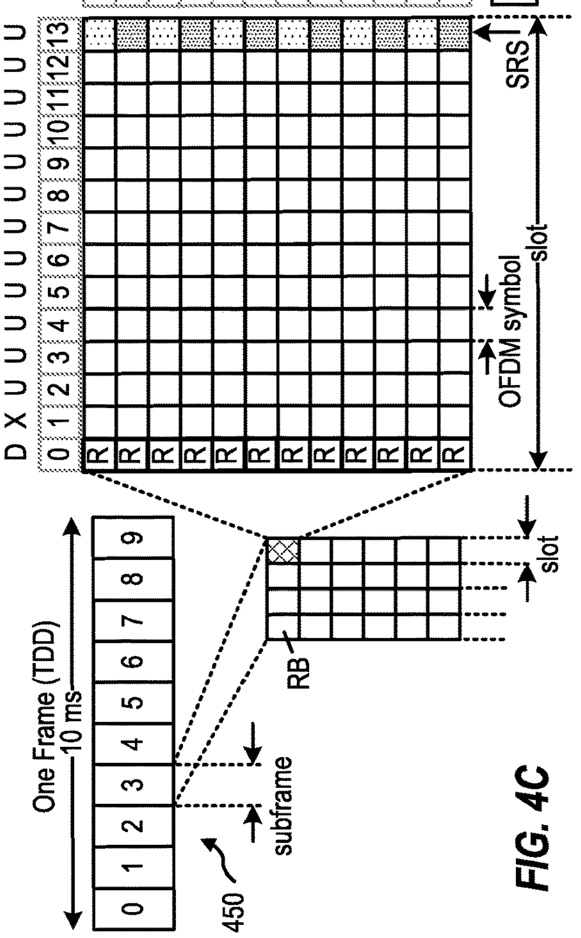
Figure 4D:
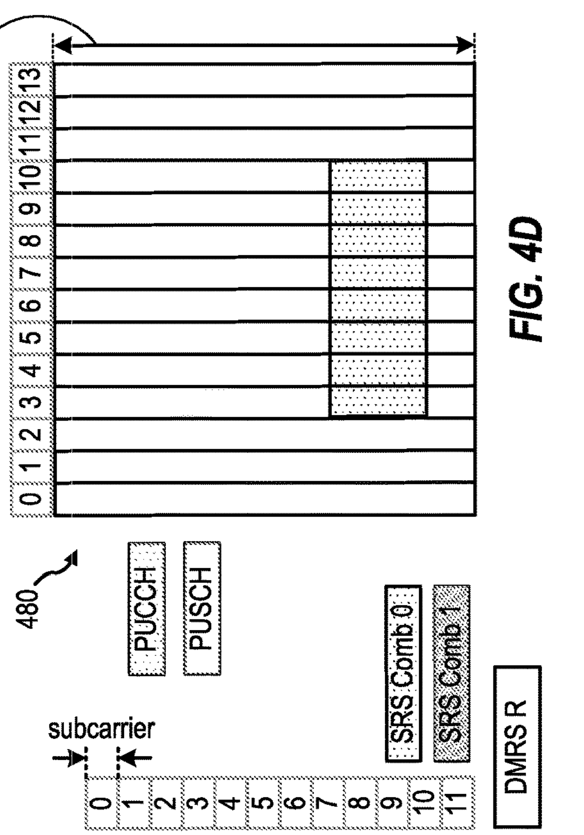

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies (p) 0 to 6 allow for 1, 2, 4, 8, 16, 32, and 64 slots, respectively, per subframe. For slot configuration 1, different numerologies 0 to 2 allow for 2, 4, and 8 slots, respectively, per subframe. Accordingly, for slot configuration 0 and numerology p, there are 14 symbols/slot and 2p slots/subframe. The subcarrier spacing and symbol length/duration are a function of the numerology. The subcarrier spacing may be equal to 2×15 kHz, where is the numerology 0 to 6. As such, the numerology p=0 has a subcarrier spacing of 15 kHz and the numerology p=6 has a subcarrier spacing of 960 kHz. The symbol length/duration is inversely related to the subcarrier spacing. FIGS. 4A, 4B, 4C, and 4D provide an example of slot configuration 0 with 14 symbols per slot and numerology p=2 with 4 slots per subframe. The slot duration is 0.25 ms, the subcarrier spacing is 60 kHz, and the symbol duration is approximately 16.67 s.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Overview of Random Access Channel (RACH) Occasions (ROs)

Figure 5:
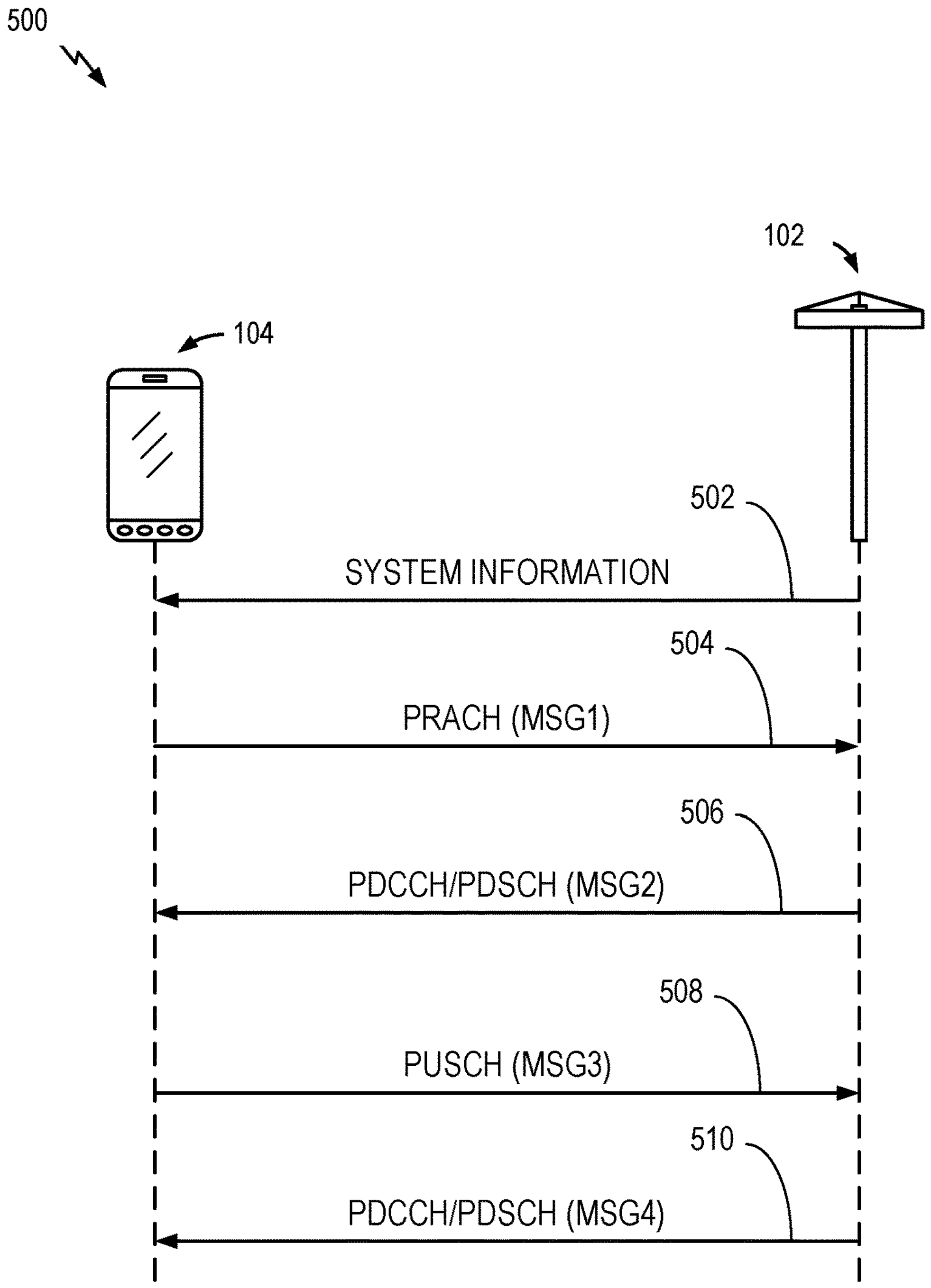
FIG. 5 depicts a call flow diagram illustrating an example four-step random access channel (RACH) procedure, in accordance with certain aspects of the present disclosure.

FIG. 5 is a call-flow diagram 500 illustrating an example four-step RACH procedure, in accordance with certain aspects of the present disclosure. A first message (MSG1) may be sent from the UE 104 to BS 102 on the physical random access channel (PRACH). In this case, MSG1 may only include a RACH preamble 504. BS 102 may respond with a random access response (RAR) message 506 (MSG2) which may include the identifier (ID) of the RACH preamble, a timing advance (TA), an uplink grant, cell radio network temporary identifier (C-RNTI), and a back off indicator (BI). MSG2 may include a PDCCH communication including control information for (e.g., scheduling a reception of) a following communication on the PDSCH, as illustrated. In response to MSG2, MSG3 is transmitted from the UE 104 to BS 102 on the PUSCH 508. MSG3 may include one or more of an RRC connection request, a tracking area update request, a system information request, a positioning fix or positioning signal request, or a scheduling request. The BS 102 then responds with MSG4 which may include a contention resolution message 510. In some cases, the UE 104 may also receive system information 502 (e.g., also referred to herein as a system information message) indicating various communication parameters that may be used by the UE 104 for communicating with the BS 102.

Figure 6:
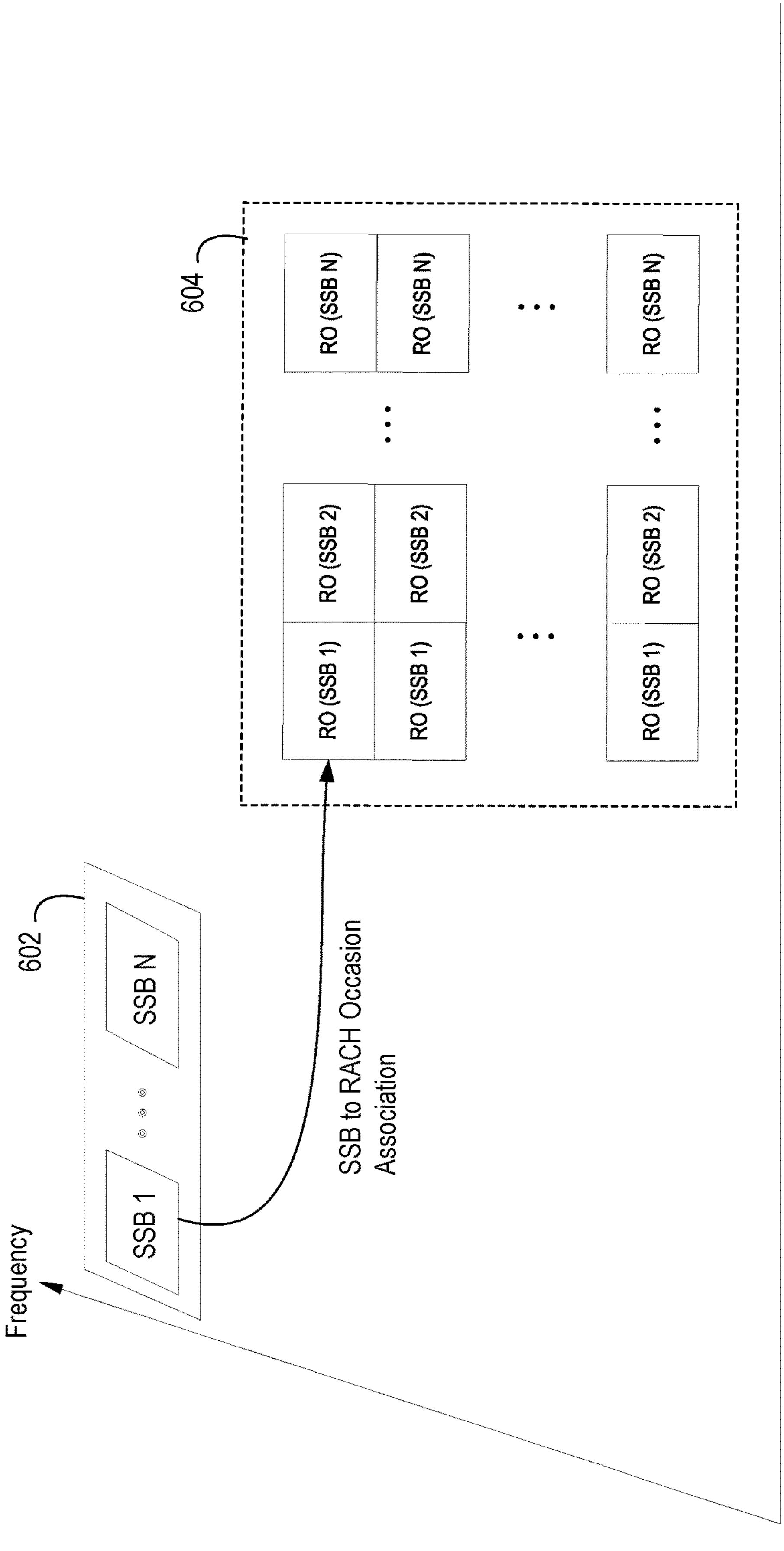
FIG. 6 depicts an example association of SSBs to RACH occasions (ROs).

FIG. 6 depicts an example association (mapping) of SSBs 602 to RACH occasions (ROs) 604. This SSB to RO association is used for the gNB to know what beam the UE has acquired/is using (generally referred to as beam establishment). One SSB may be associated with one or more ROs or more than one SSB may be associated with one RO. Association is typically performed in the frequency domain first, then in the time domain within a RACH slot, then in the time domain across RACH slots (e.g., beginning with lower SSB indexes). An association period is typically defined as a minimum number of RACH configuration periods, such that all (configured) SSB beams are mapped into ROs.

In some cases, SSBs/beams detected in one BWP may be mapped to ROs in another BWP. In such cases, aspects of the present disclosure may adjust PRACH related timing to account for BWP switching (e.g., extending a timeline in which the UE is expected to transmit a PRACH to account for additional BWP switching delay).

Overview of PRACH Triggering and Cell Mobility

PRACH triggering from a network entity may be based on higher layer signaling (e.g., RRC) or, in some cases, lower layer signaling such as a physical downlink control channel (PDCCH). In some cases, PRACH transmissions for uplink (UL) timing in a candidate cell may be triggered via a downlink control information (DCI) from a serving cell.

Triggering PRACH transmissions may be beneficial in certain scenarios, for example, where a UE may move between a preconfigured set of candidate cells. In the illustrated example, the UE moves from a first cell (e.g., an old serving/primary cell) to a new serving candidate cell. In this case, the UE may not receive data or control information in the candidate cell, but may transmit a PRACH in order to facilitate timing adjustment for the new candidate cell before a cell change.

In some cases, a RACH may be triggered via a cell switch command MAC-CE. For example, a cell switch command MAC-CE may be sent by a source/serving cell in order to trigger a RACH transmission in a candidate/target cell.

Overview of Dynamic Signaling-Based Mobility

As noted above, dynamic mobility signaling (e.g., L1 and/or L2-centric mobility or LTM) may lead to more efficient intra-cell and inter-cell mobility with reduced latency.

In some cases, the network may configure (e.g., via RRC signaling), a set of cells for L1/L2 mobility (referred to herein as an L1/L2 Mobility Configured cell set). At any given time, the network may also configure (via L1/L2 signaling) an L1/L2 Mobility Activated cell set, which refers to a group of cells in the configured set that are activated and can be readily used for data and control transfer. The network may also configure (signal) an L1/L2 Mobility Deactivated cell set, which refers to a group of cells in the configured set that are deactivated and can be readily activated by L1/L2 signaling.

L1/L2 signaling may be used for mobility management of the activated set. For example, L1/L2 signaling may be used to activate/deactivate cells in the set, select beams within the activated cells, and update/switch a primary cell (PCell). This dynamic signaling may help provide seamless mobility within the activated cells in the set. In other words, as the UE moves, the cells from the set are deactivated and activated by L1/L2 signaling. The cells to activate and deactivate may be based on various factors, such as signal quality (measurements) and loading.

In some cases, all cells in the L1/L2 Mobility Configured cell set may belong to a same DU of a CU. This may be similar to carrier aggregation (CA), but cells may be on the same carrier frequencies. The size of the cell set configured for L1/L2 mobility signaling may vary. In general, the cell set size may be selected to be large enough to cover a meaningful mobility area.

In some cases, the UE may be provided with a subset of deactivated cells, as a candidate cell set, from which the UE could autonomously choose to add to the activated cell set. The decision of whether to add a cell from the candidate cell set to the activated cell set may be a based various factors, such as measured channel quality and loading information. In some cases, the ability for the UE to autonomously choose to add to the activated cell set may be similar to a UE decision when configured for Conditional Handover (CHO) for fast and efficient addition of the prepared cells.

In some cases, each cell may be served by an RU, and each of the RUs may have multi-carrier (N CCs) support. In such cases, each CC may be a cell (e.g., Cell 2 and Cell 2' may be different CCs of the same RU). In such cases, activation/deactivation can be done in groups of carriers (cells).

For PCell management, L1/L2 signaling may be used to set (select) the PCell out of the preconfigured options within the activated cell set. In some cases, L3 mobility may be used for PCell change (L3 handover) when a new PCell is not from the activated cell set for L1/L2 mobility. In such cases, RRC signaling may update the set of cells for L1/L2 mobility at L3 handover.

In some cases, physical layer (Layer 1 or L1) measurement may be enhanced for L1/L2 mobility, where a serving cell can be changed via L1/L2 signalling based on L1 measurement, and both synchronous and asynchronous source and target cells may be considered.

Various mechanisms and procedures of L1/L2 based inter-cell mobility may be specified for mobility latency reduction. These may include configuration and maintenance for multiple candidate cells to allow fast application of configurations for candidate cells. Dynamic switching mechanisms among candidate serving cells (including SpCell and SCell) may be supported for the potential applicable scenarios based on L1/L2 signaling.

L1 enhancements for inter-cell beam management, may include L1 measurement and reporting, as well as beam indication. Timing Advance (TA) management and CU-DU interface signaling may also be provided to support L1/L2 mobility.

L1/L2 based inter-cell mobility procedures may be applicable to a variety of scenarios. These scenarios may include standalone, CA and new radio-dual connectivity (NR-DC) cases with serving cell change within one cell group (CG), intra-distributed unit (DU) cases and intra-central unit (CU) inter-DU cases, intra-frequency and inter-frequency scenarios, both FR1 and FR2 scenarios, and scenarios where source and target cells may be synchronized or non-synchronized.

Aspects Related to Association Period Based PRACH Adaptation and Activation

Aspects of the present disclosure provide mechanisms that may help ensure the UE and network are in agreement regarding an association period when PRACH adaptation is used.

As noted above, the number or periodicity of SSB transmissions, as well as ROs for corresponding PRACH transmissions, may be adapted in the time domain. In such cases, PRACH adaptation may be implemented via a first step that involves RRC configuration of extra ROs (e.g., through a separate PRACH configuration index or a different PRACH periodicity) and a second step that involves activation of the configured extra ROs.

Figure 7A:
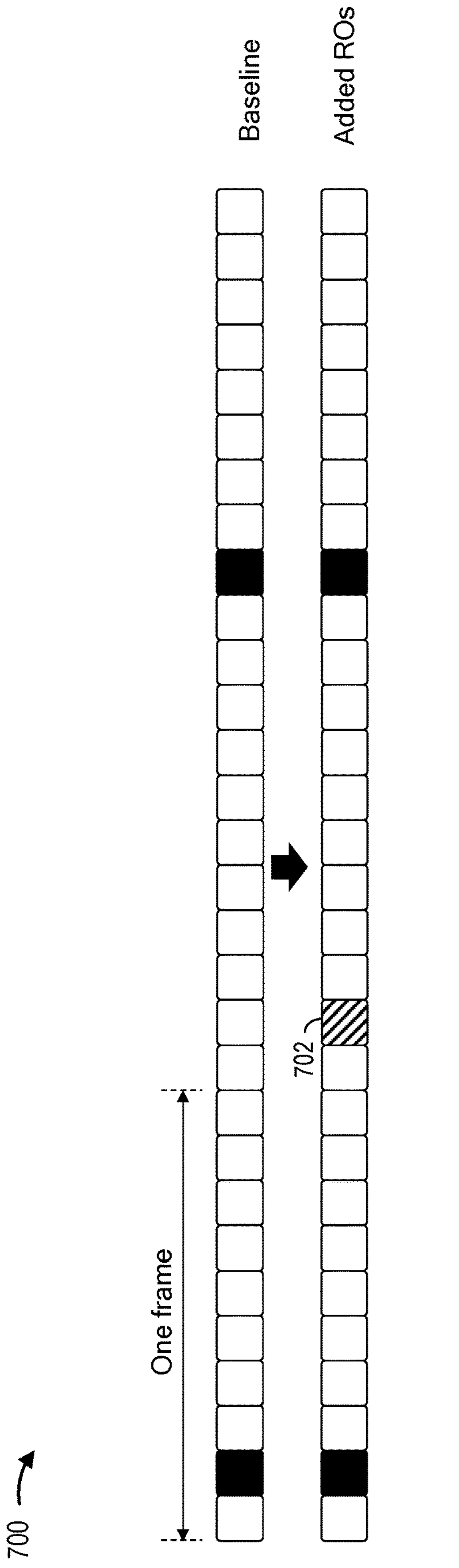
FIG. 7A depicts a diagram illustrating example PRACH adaptation involving adding ROs.
Figure 7B:
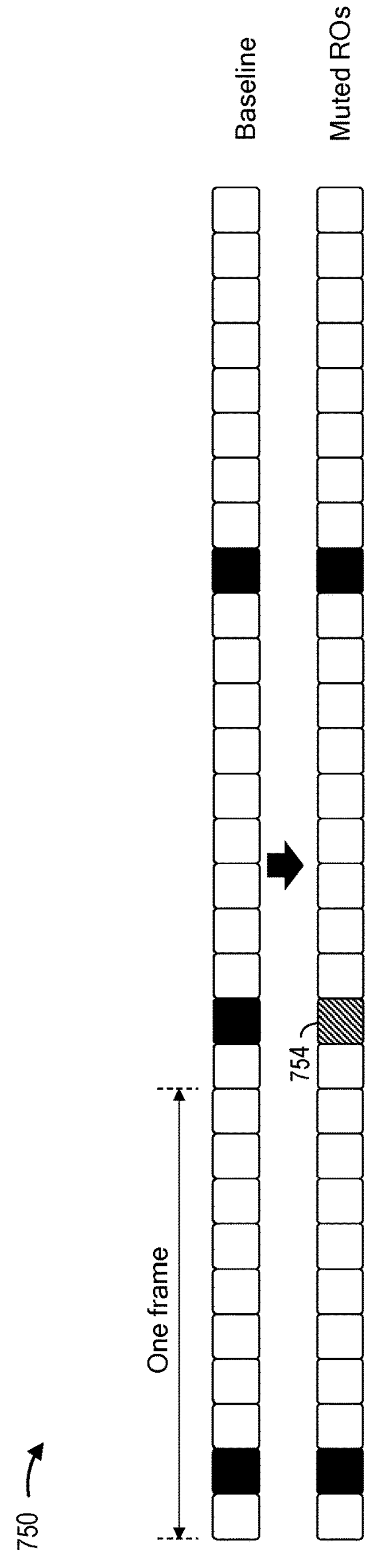
FIG. 7B depicts a diagram illustrating example PRACH adaptation involving muting ROs.

PRACH adaptation may involve adding or remove ROs. FIG. 7A depicts a diagram 700 illustrating example PRACH adaptation involving adding ROs. In the illustrated example, a baseline set of ROs includes two active ROs. As illustrated, after adaptation, an RO 702 is added. FIG. 7B depicts a diagram 750 illustrating example PRACH adaptation involving muting (removing) ROs. In the illustrated example, the baseline set of ROs includes three active ROs (e.g., the same as in FIG. 7A after adding RO 702 via PRACH adaptation). As illustrated, after PRACH adaptation, RO 754 is muted (removed).

As noted above, the RACH process is typically managed according to an association period, in which a mapping of SSBs to ROs is performed. An association period may defined as a (shortest) period in which each SSB is mapped to at least one RO. Aspects of the present disclosure provide mechanisms that may help ensure a UE and network determine the same association period, even after PRACH adaptation.

Figure 8:
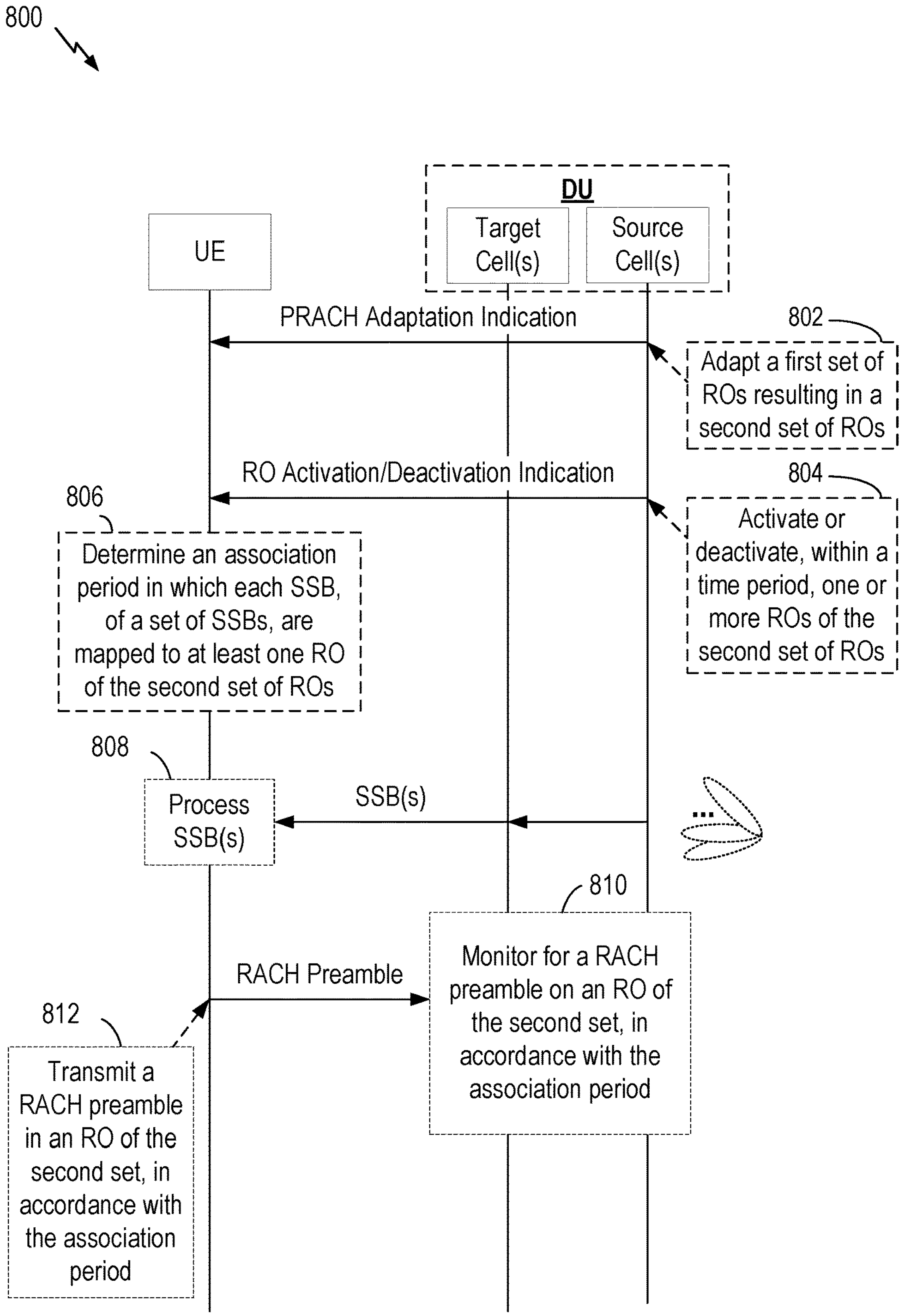
FIG. 8 depicts a call flow diagram illustrating association period based PRACH adaptation and activation, in accordance with aspects of the present disclosure.

FIG. 8 depicts a call flow diagram 800 illustrating association period based PRACH adaptation and activation, in accordance with aspects of the present disclosure.

In some aspects, the UE shown in FIG. 8 may be an example of the UE 104 depicted and described with respect to FIGS. 1 and 3. Similarly, the network entities (e.g., target cell(s), source cell(s), and/or DU) shown in FIG. 8 may be examples of the BS 102 (e.g., a gNB) depicted and described with respect to FIGS. 1 and 3 or a disaggregated base station depicted and described with respect to FIG. 2. As illustrated, in some cases, the network entity may include a DU that is associated with a source cell and one or more target cells (e.g., candidate cells for LTM).

As illustrated at 802, the network (e.g., source cell(s)) may transmit a PRACH adaptation indication, adapting a first set of ROs resulting in a second set of ROs. As illustrated at 804, the network (e.g., source cell(s)) may transmit an RO activation/deactivation indication, activating or deactivating, within a time period (e.g., a PRACH configuration period, the association period, or an association pattern period), one or more ROs of the second set of ROs.

As illustrated at 806, the UE may determine an association period in which each SSB of a set of SSBs, are mapped to at least one RO of the second set of ROs. As illustrated at 808, the UE may process one or more SSBs (e.g., transmitted by target cell(s)) in ROs according to the mapping of SSBs to ROs.

As illustrated at 810, the network (e.g., target cell(s)) may monitor for a RACH preamble on an RO of the second set. As illustrated at 812, the UE may transmit a RACH preamble in an RO of the second set, in accordance with the association period.

Figure 9:
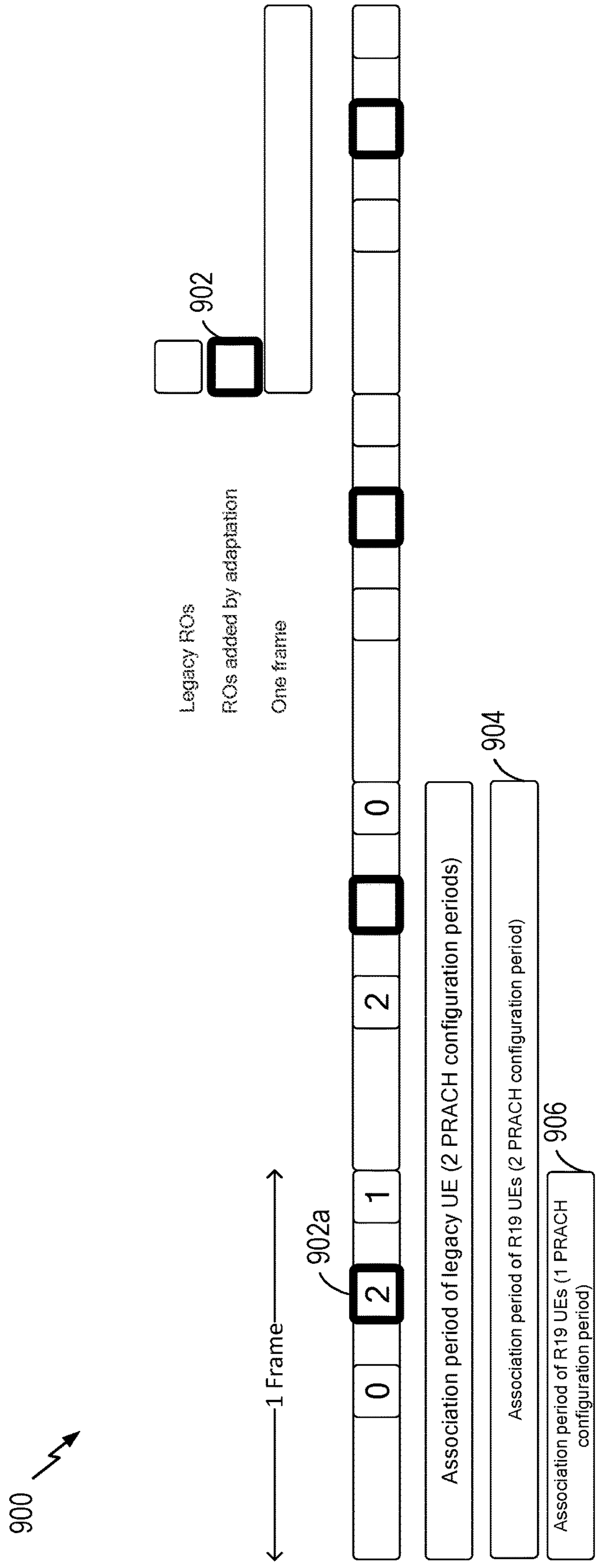
FIG. 9 depicts a diagram illustrating examples of association periods determined based on PRACH adaptation adding ROs and an example mapping of SSBs to ROs following the PRACH adaptation.

FIG. 9 depicts a diagram 900 illustrating examples of association periods determined based on PRACH adaptation adding ROs and an example mapping of SSBs to ROs following the PRACH adaptation. In example, 900, numbers labeled in the ROs indicate SSBs mapped to these ROs. The example assumes a PRACH configuration of 1 frame and that an RO 902*a* is added via PRACH adaptation.

Prior to PRACH adaptation, SSBs 0, 1, and 2 are mapped to ROs that span 2 PRACH configuration periods. Therefore, according to a conventional approach a UE (e.g., a legacy UE) would determine an association period of two PRACH configuration periods.

In some cases, separate SSB to RO mappings may be indicated for legacy ROs and ROs added/removed by adaptation. In such cases, separate association periods may defined for legacy ROs and ROs added by adaptation.

In other cases, joint mapping may be used (for legacy ROs and ROs added/removed by adaptation). In such cases, one approach for association period determination after PRACH adaptation would be to use the same association period of two PRACH configuration periods, as indicated at 904.

As illustrated, however, SSB 2 is mapped to RO 902*a* that was added via PRACH adaptation. Thus, after PRACH adaptation, all active SSBs 0, 1, and 2 are mapped to ROs within a single PRACH configuration period. Therefore, another approach for association period determination after PRACH adaptation would be to base the determination on the RO set after adaptation and use an association period of one PRACH configuration period, as indicated at 906. This approach may take advantage of the knowledge that UEs that support PRACH adaptation have regarding ROs added/removed via PRACH adaptation.

Figure 10:
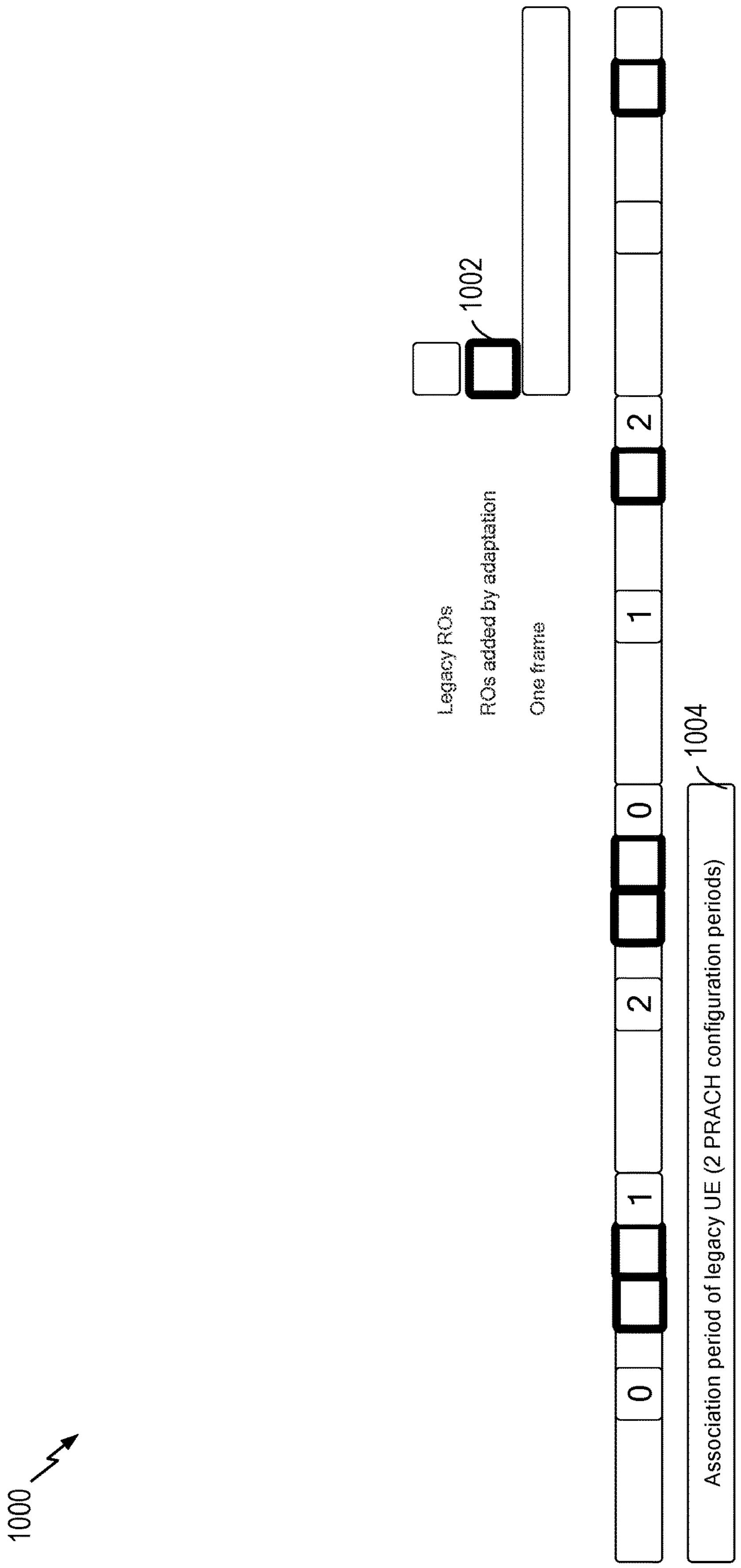
FIG. 10 depicts a diagram illustrating an example mapping of SSBs to ROs following PRACH adaptation adding ROs.

FIG. 10 depicts a diagram 1000 illustrating another example mapping of SSBs to ROs following PRACH adaptation adding ROs 1002. In the illustrated, example, an association period corresponding to the legacy UE, spanning 2 PRACH configuration periods is used, as indicated at 1004.

In some cases, (PRACH adaptation) signaling that indicates activation/deactivation of ROs may include a bitmap that activates/deactivates certain ROs (e.g., ROs 1002 added by PRACH adaptation in FIG. 10) within a given time period. For example, the time period can be an integer multiple of PRACH configuration period, an association period or an association pattern period. In this context, an association pattern period may include one or more association periods and may be determined such that a pattern between PRACH occasions and SSBs repeats at most every 160 msec. PRACH occasions not associated with SSBs after an integer number of association periods, if any, are not used for PRACH transmissions.

In some cases, the bitmap (provided with the activation/deactivation indication) may represent all ROs, valid and invalid. In other cases, the bitmap may represent only valid ROs. If the bitmap is longer (has more bits) than the available ROs in a given time period, the UE may consider only the first set of bits in the bitmap that correspond to the available ROs. For example, because there are 4 available ROs 1002 (added/configured by adaptation) in the association period 1004 shown in FIG. 4, if the UE receives a bitmap with more than 4 bits, the UE may consider only the first four bits and ignore the excess bits.

According to certain aspects, the activation indication may indicate a set of beams to map to the newly added ROs. For example, the activation indication may include a bitmap which gives an indication of SSB indices that map to the newly added ROs. This bitmap may be similar to that included in a configured parameter ssbpositioninBurst that indicates which SSBs are transmitted.

Figure 11:
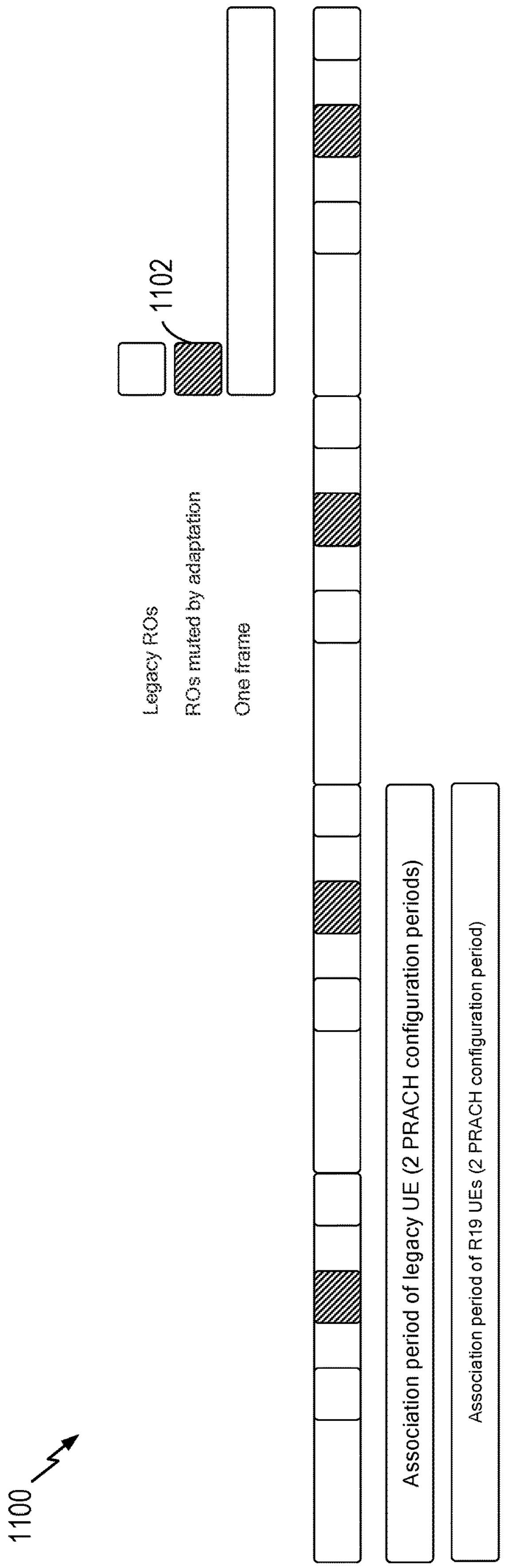
FIG. 11 depicts a diagram illustrating examples of association periods determined based on PRACH adaptation muting ROs.

FIG. 11 depicts a diagram 1100 illustrating examples of association periods determined based on PRACH adaptation muting ROs. As noted above, and as illustrated in FIG. 11, PRACH adaptation may include muting ROs 1102, essentially removing/deactivating those ROs.

In some aspects, a UE may consider muted ROs 1102 as invalid, and may consider this invalidity when mapping SSBs to ROs. This may result in a different SSB to RO mapping/association, compared to a legacy UE (e.g., a UE that is unaware of or does not support PRACH adaptation).

In some aspects, a UE may consider muted ROs 1102 as invalid, but may not consider this invalidity when mapping SSBs to ROs. This may result in a same SSB to RO mapping/association, compared to a legacy UE. In some aspects, a UE may consider muted ROs 1102 as valid but may still not use them (e.g., for mapping and/or for transmitting a RACH preamble).

Figure 12:
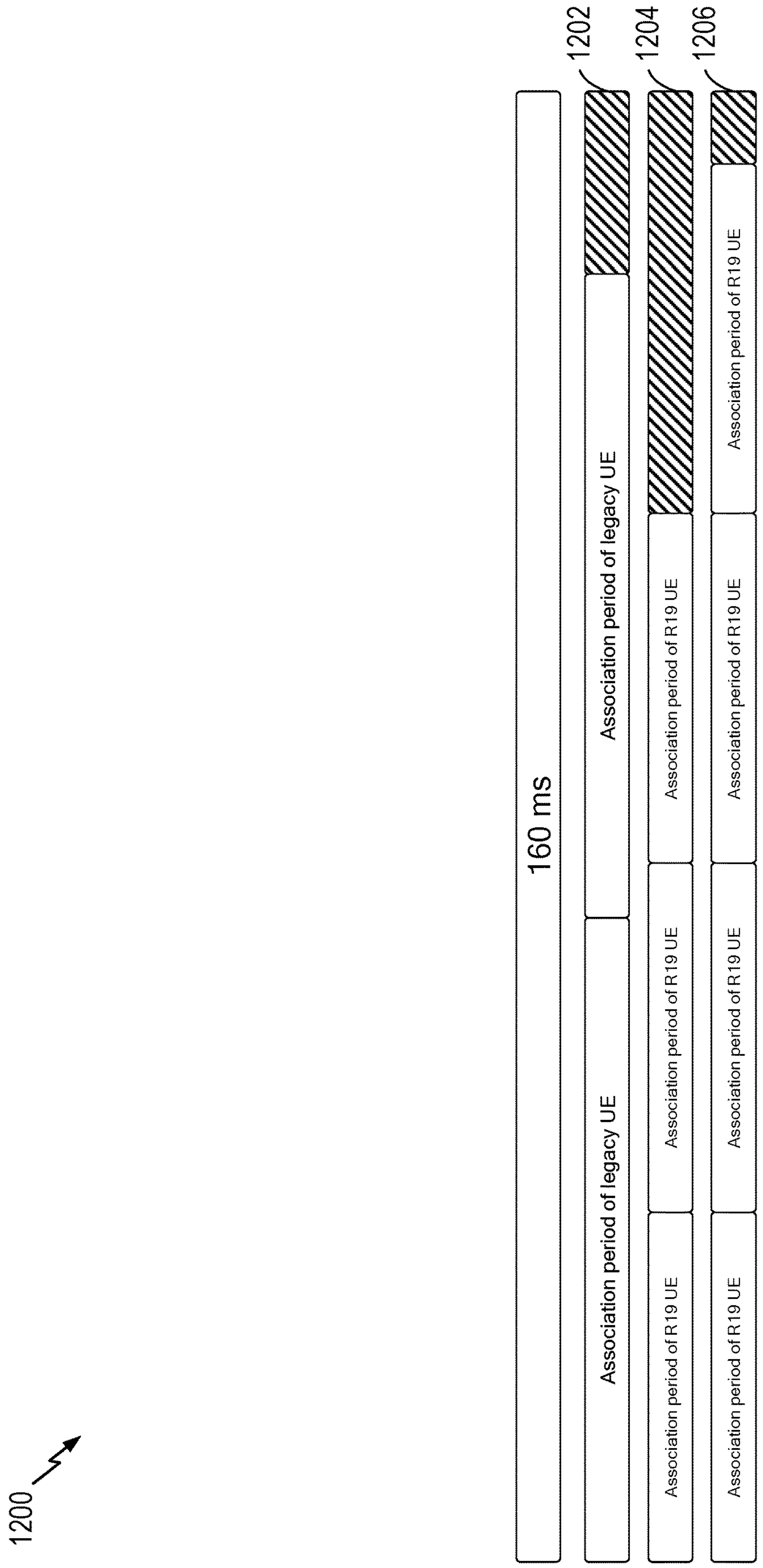
FIG. 12 depicts a diagram illustrating example association pattern periods.

FIG. 12 depicts a diagram 1200 illustrating example association pattern periods. In certain time durations, such as time durations 1202, 1204, and 1206, ROs may be unused by legacy UEs (e.g., because they do not fit in an association pattern period). In such cases, according to certain aspects of the present disclosure, such time durations may be considered as prohibited for RACH operation by UEs. Thus, the UE may not transmit PRACH preambles on ROs within these time durations (and the network will not monitor these ROs).

In some aspects, however, ROs within these time durations may be usable by UEs, but only for ROs that have been added via PRACH adaptation. Alternatively, in some aspects, these time durations may be usable by UEs for any ROs (e.g., including ROs that were not added via PRACH adaptation).

Example Operations

Figure 13:
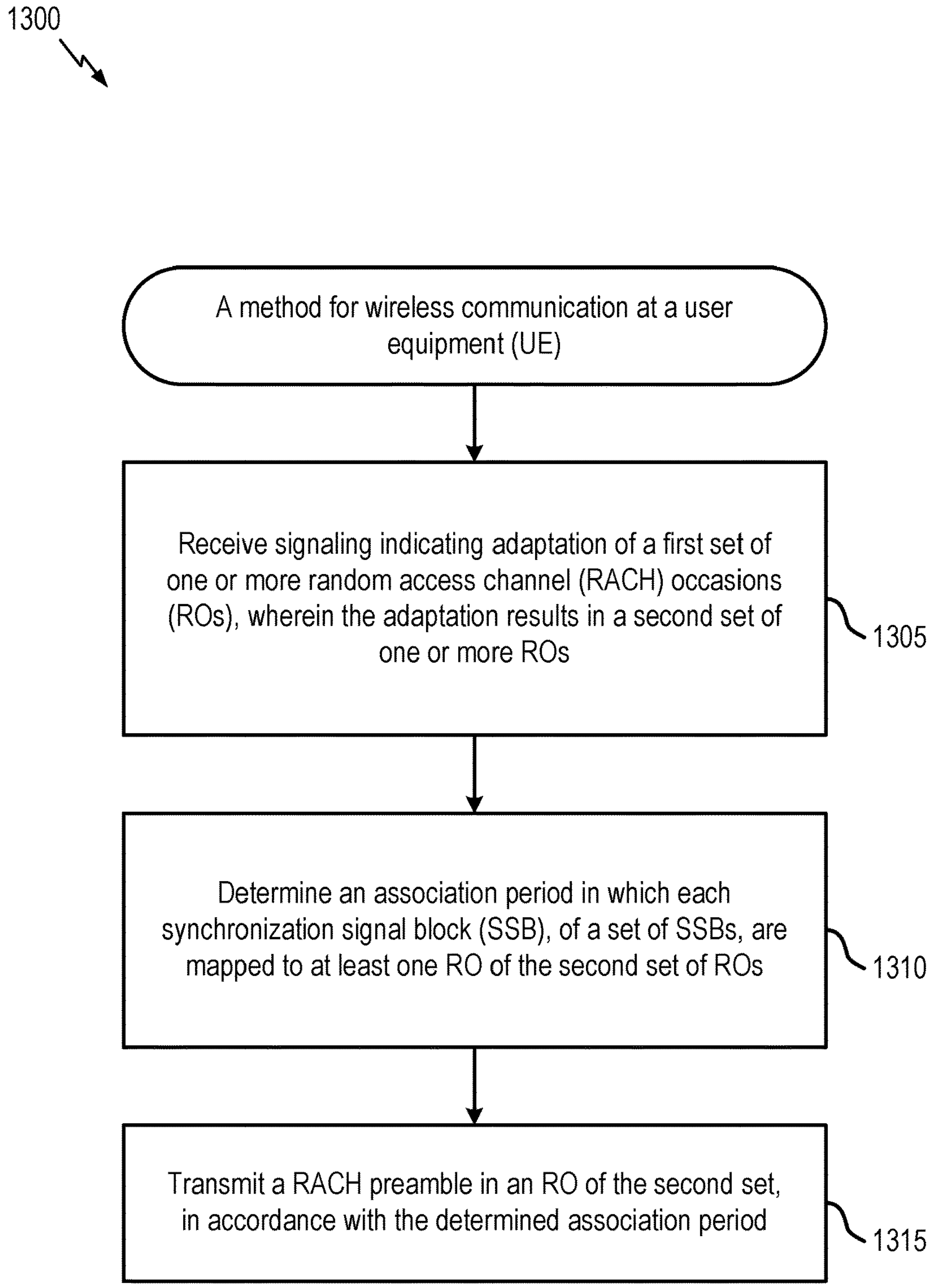
FIG. 13 depicts a method for wireless communications.

FIG. 13 shows an example of a method 1300 of wireless communication at a user equipment (UE), such as a UE 104 of FIGS. 1 and 3.

Method 1300 begins at step 1305 with receiving signaling indicating adaptation of a first set of one or more random access channel (RACH) occasions (ROs), wherein the adaptation results in a second set of one or more ROs. In some cases, the operations of this step refer to, or may be performed by, circuitry for receiving and/or code for receiving as described with reference to FIG. 15.

Method 1300 then proceeds to step 1310 with determining an association period in which each synchronization signal block (SSB), of a set of SSBs, are mapped to at least one RO of the second set of ROs. In some cases, the operations of this step refer to, or may be performed by, circuitry for determining and/or code for determining as described with reference to FIG. 15.

Method 1300 then proceeds to step 1315 with transmitting a RACH preamble in an RO of the second set, in accordance with the determined association period. In some cases, the operations of this step refer to, or may be performed by, circuitry for transmitting and/or code for transmitting as described with reference to FIG. 15.

In some aspects, the adaptation of the one or more ROs comprises at least one of: adding one or more ROs, or muting one or more ROs.

In some aspects, the association period is determined based on the first set of ROs.

In some aspects, the association period is determined based on the second set of ROs.

In some aspects, the method 1300 further includes receiving an indication that activates or deactivates, within a time period, one or more ROs of the second set. In some cases, the operations of this step refer to, or may be performed by, circuitry for receiving and/or code for receiving as described with reference to FIG. 15.

In some aspects, the time period comprises at least one of: a physical RACH (PRACH) configuration period, the association period, or an association pattern period.

In some aspects, the indication comprises a bitmap that indicates activated or deactivated ROs of the second set; and the bitmap indicates only valid ROs that are activated or deactivated.

In some aspects, the indication indicates a set of beams for mapping to one or more ROs of the second set that were added via the adaptation.

In some aspects, the method 1300 further includes determining validity or invalidity of ROs of the second set, wherein the determination of the association period is further based on the determined validity or invalidity of ROs of the second set. In some cases, the operations of this step refer to, or may be performed by, circuitry for determining and/or code for determining as described with reference to FIG. 15.

In some aspects, ROs that were muted via the adaptation are considered as invalid.

In some aspects, the determination of the association period is further based on a rule that SSBs are only mapped to ROs considered as valid.

In some aspects, the RACH preamble is transmitted in an RO in a time duration that does not fit in an association pattern period.

In some aspects, the RACH preamble is transmitted in an RO that was added via the adaptation.

Figure 15:
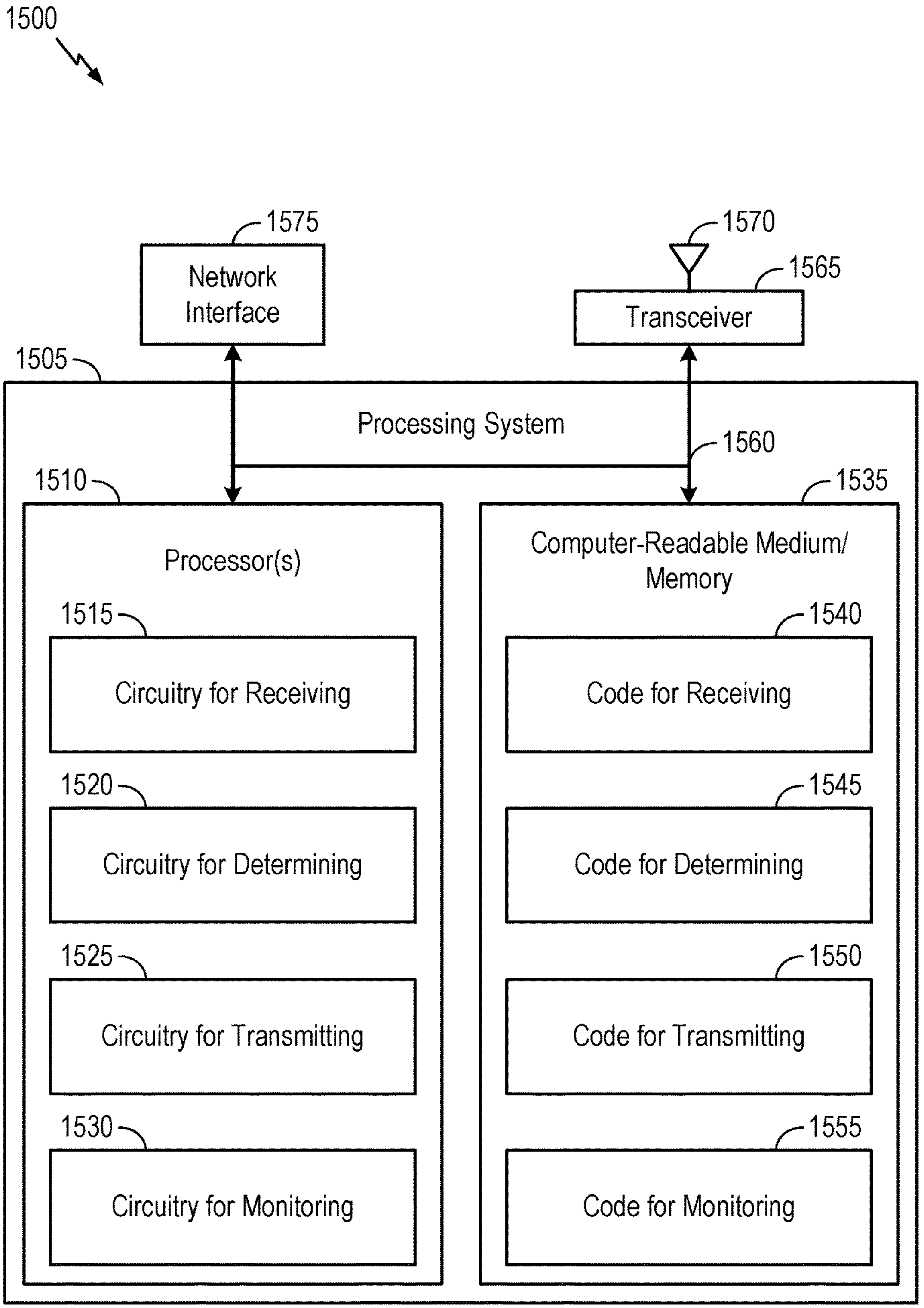
FIG. 15 depicts aspects of an example communications device.

In one aspect, method 1300, or any aspect related to it, may be performed by an apparatus, such as communications device 1500 of FIG. 15, which includes various components operable, configured, or adapted to perform the method 1300. Communications device 1500 is described below in further detail.

Note that FIG. 13 is just one example of a method, and other methods including fewer, additional, or alternative steps are possible consistent with this disclosure.

Figure 14:
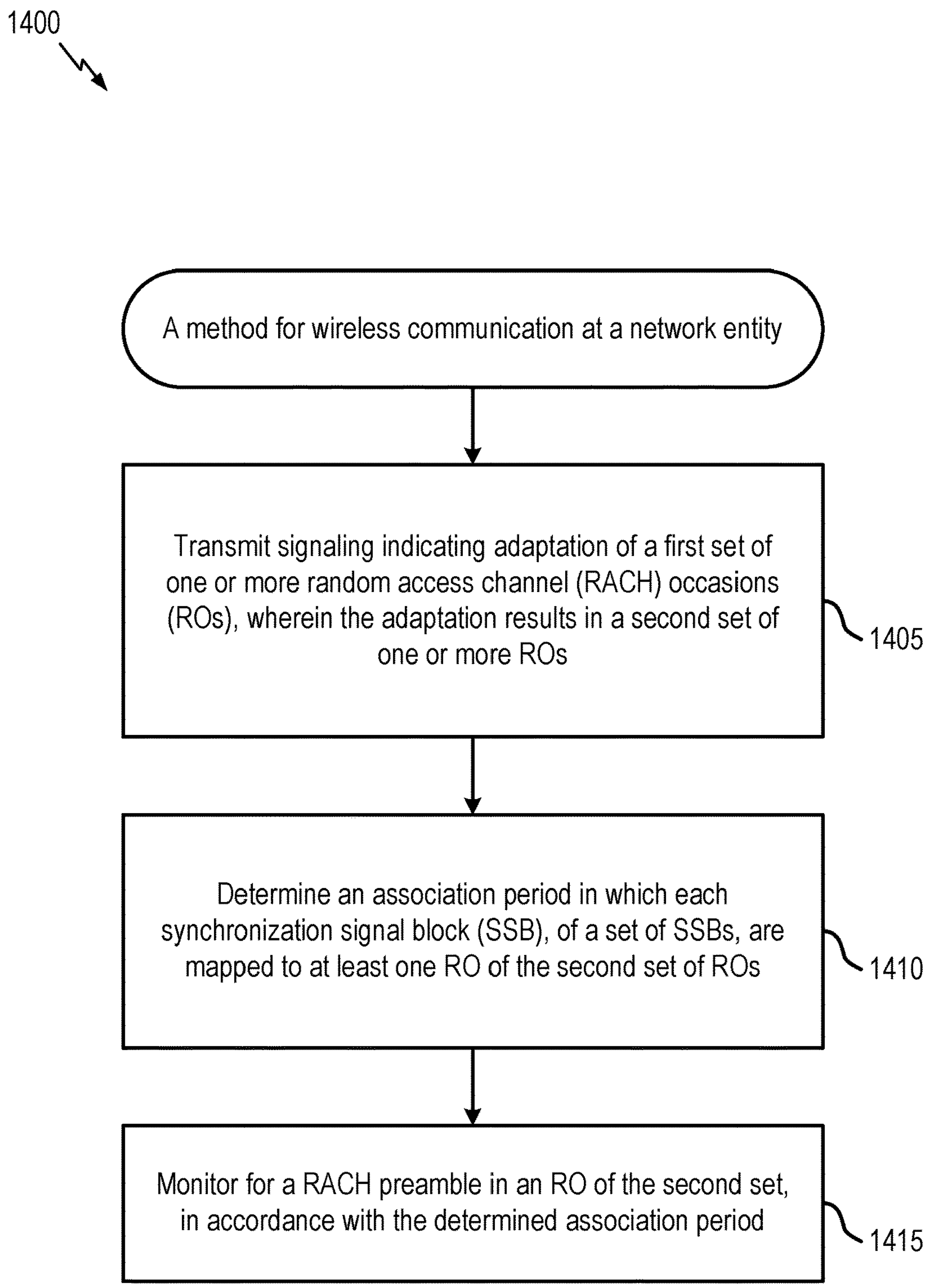
FIG. 14 depicts a method for wireless communications.

FIG. 14 shows an example of a method 1400 of wireless communication at a network entity, such as a BS 102 of FIGS. 1 and 3, or a disaggregated base station as discussed with respect to FIG. 2.

Method 1400 begins at step 1405 with transmitting signaling indicating adaptation of a first set of one or more random access channel (RACH) occasions (ROs), wherein the adaptation results in a second set of one or more ROs. In some cases, the operations of this step refer to, or may be performed by, circuitry for transmitting and/or code for transmitting as described with reference to FIG. 15.

Method 1400 then proceeds to step 1410 with determining an association period in which each synchronization signal block (SSB), of a set of SSBs, are mapped to at least one RO of the second set of ROs. In some cases, the operations of this step refer to, or may be performed by, circuitry for determining and/or code for determining as described with reference to FIG. 15.

Method 1400 then proceeds to step 1415 with monitoring for a RACH preamble in an RO of the second set, in accordance with the determined association period. In some cases, the operations of this step refer to, or may be performed by, circuitry for monitoring and/or code for monitoring as described with reference to FIG. 15.

In some aspects, the adaptation of the one or more ROs comprises at least one of: adding one or more ROs, or muting one or more ROs.

In some aspects, the association period is determined based on the first set of ROs.

In some aspects, the association period is determined based on the second set of ROs.

In some aspects, the method 1400 further includes transmitting an indication that activates or deactivates, within a time period, one or more ROs of the second set. In some cases, the operations of this step refer to, or may be performed by, circuitry for transmitting and/or code for transmitting as described with reference to FIG. 15.

In some aspects, the time period comprises at least one of: a physical RACH (PRACH) configuration period, the association period, or an association pattern period.

In some aspects, the indication comprises a bitmap that indicates activated or deactivated ROs of the second set; and the bitmap indicates only valid ROs that are activated or deactivated.

In some aspects, the indication indicates a set of beams for mapping to one or more ROs of the second set that were added via the adaptation.

In some aspects, the method 1400 further includes determining validity or invalidity of ROs of the second set, wherein the determination of the association period is further based on the determined validity or invalidity of ROs of the second set. In some cases, the operations of this step refer to, or may be performed by, circuitry for determining and/or code for determining as described with reference to FIG. 15.

In some aspects, ROs that were muted via the adaptation are considered as invalid.

In some aspects, the determination of the association period is further based on a rule that SSBs are only mapped to ROs considered as valid.

In some aspects, the network entity monitors for the RACH preamble in an RO in a time duration that does not fit in an association pattern period.

In some aspects, the network entity monitors for the RACH preamble in an RO that was added via the adaptation.

In one aspect, method 1400, or any aspect related to it, may be performed by an apparatus, such as communications device 1500 of FIG. 15, which includes various components operable, configured, or adapted to perform the method 1400. Communications device 1500 is described below in further detail.

Note that FIG. 14 is just one example of a method, and other methods including fewer, additional, or alternative steps are possible consistent with this disclosure.

Example Communications Device(s)

FIG. 15 depicts aspects of an example communications device 1500. In some aspects, communications device 1500 is a user equipment, such as UE 104 described above with respect to FIGS. 1 and 3. In some aspects, communications device 1500 is a network entity, such as BS 102 of FIGS. 1 and 3, or a disaggregated base station as discussed with respect to FIG. 2.

The communications device 1500 includes a processing system 1505 coupled to the transceiver 1565 (e.g., a transmitter and/or a receiver). In some aspects (e.g., when communications device 1500 is a network entity), processing system 1505 may be coupled to a network interface 1575 that is configured to obtain and send signals for the communications device 1500 via communication link(s), such as a backhaul link, midhaul link, and/or fronthaul link as described herein, such as with respect to FIG. 2. The transceiver 1565 is configured to transmit and receive signals for the communications device 1500 via the antenna 1570, such as the various signals as described herein. The processing system 1505 may be configured to perform processing functions for the communications device 1500, including processing signals received and/or to be transmitted by the communications device 1500.

The processing system 1505 includes one or more processors 1510. In various aspects, the one or more processors 1510 may be representative of one or more of receive processor 358, transmit processor 364, TX MIMO processor 366, and/or controller/processor 380, as described with respect to FIG. 3. In various aspects, one or more processors 1510 may be representative of one or more of receive processor 338, transmit processor 320, TX MIMO processor 330, and/or controller/processor 340, as described with respect to FIG. 3. The one or more processors 1510 are coupled to a computer-readable medium/memory 1535 via a bus 1560. In certain aspects, the computer-readable medium/memory 1535 is configured to store instructions (e.g., computer-executable code) that when executed by the one or more processors 1510, cause the one or more processors 1510 to perform the method 1300 described with respect to FIG. 13, or any aspect related to it; and the method 1400 described with respect to FIG. 14, or any aspect related to it. Note that reference to a processor performing a function of communications device 1500 may include one or more processors 1510 performing that function of communications device 1500.

In the depicted example, computer-readable medium/memory 1535 stores code (e.g., executable instructions), such as code for receiving 1540, code for determining 1545, code for transmitting 1550, and code for monitoring 1555. Processing of the code for receiving 1540, code for determining 1545, code for transmitting 1550, and code for monitoring 1555 may cause the communications device 1500 to perform the method 1300 described with respect to FIG. 13, or any aspect related to it; and the method 1400 described with respect to FIG. 14, or any aspect related to it.

The one or more processors 1510 include circuitry configured to implement (e.g., execute) the code stored in the computer-readable medium/memory 1535, including circuitry for receiving 1515, circuitry for determining 1520, circuitry for transmitting 1525, and circuitry for monitoring 1530. Processing with circuitry for receiving 1515, circuitry for determining 1520, circuitry for transmitting 1525, and circuitry for monitoring 1530 may cause the communications device 1500 to perform the method 1300 described with respect to FIG. 13, or any aspect related to it; and the method 1400 described with respect to FIG. 14, or any aspect related to it.

Various components of the communications device 1500 may provide means for performing the method 1300 described with respect to FIG. 13, or any aspect related to it; and the method 1400 described with respect to FIG. 14, or any aspect related to it. For example, means for transmitting, sending or outputting for transmission may include transceivers 354 and/or antenna(s) 352 of the UE 104 illustrated in FIG. 3, transceivers 332 and/or antenna(s) 334 of the BS 102 illustrated in FIG. 3, and/or the transceiver 1565 and the antenna 1570 of the communications device 1500 in FIG. 15. Means for receiving or obtaining may include transceivers 354 and/or antenna(s) 352 of the UE 104 illustrated in FIG. 3, transceivers 332 and/or antenna(s) 334 of the BS 102 illustrated in FIG. 3, and/or the transceiver 1565 and the antenna 1570 of the communications device 1500 in FIG. 15.

Example Clauses

Implementation examples are described in the following numbered clauses:

Clause 1: A method for wireless communication at a user equipment (UE), comprising: receiving signaling indicating adaptation of a first set of one or more random access channel (RACH) occasions (ROs), wherein the adaptation results in a second set of one or more ROs; determining an association period in which each synchronization signal block (SSB), of a set of SSBs, are mapped to at least one RO of the second set of ROs; and transmitting a RACH preamble in an RO of the second set, in accordance with the determined association period.

Clause 2: The method of Clause 1, wherein the adaptation of the one or more ROs comprises at least one of: adding one or more ROs, or muting one or more ROs.

Clause 3: The method of any one of Clauses 1-2, wherein the association period is determined based on the first set of ROs.

Clause 4: The method of any one of Clauses 1-3, wherein the association period is determined based on the second set of ROs.

Clause 5: The method of any one of Clauses 1-4, further comprising receiving an indication that activates or deactivates, within a time period, one or more ROs of the second set.

Clause 6: The method of Clause 5, wherein the time period comprises at least one of: a physical RACH (PRACH) configuration period, the association period, or an association pattern period.

Clause 7: The method of Clause 5, wherein: the indication comprises a bitmap that indicates activated or deactivated ROs of the second set; and the bitmap indicates only valid ROs that are activated or deactivated.

Clause 8: The method of Clause 5, wherein the indication indicates a set of beams for mapping to one or more ROs of the second set that were added via the adaptation.

Clause 9: The method of Clause 5, further comprising determining validity or invalidity of ROs of the second set, wherein the determination of the association period is further based on the determined validity or invalidity of ROs of the second set.

Clause 10: The method of Clause 9, wherein ROs that were muted via the adaptation are considered as invalid.

Clause 11: The method of Clause 10, wherein the determination of the association period is further based on a rule that SSBs are only mapped to ROs considered as valid.

Clause 12: The method of any one of Clauses 1-11, wherein the RACH preamble is transmitted in an RO in a time duration that does not fit in an association pattern period.

Clause 13: The method of Clause 12, wherein the RACH preamble is transmitted in an RO that was added via the adaptation.

Clause 14: A method for wireless communication at a network entity, comprising: transmitting signaling indicating adaptation of a first set of one or more random access channel (RACH) occasions (ROs), wherein the adaptation results in a second set of one or more ROs; determining an association period in which each synchronization signal block (SSB), of a set of SSBs, are mapped to at least one RO of the second set of ROs; and monitoring for a RACH preamble in an RO of the second set, in accordance with the determined association period.

Clause 15: The method of Clause 14, wherein the adaptation of the one or more ROs comprises at least one of: adding one or more ROs, or muting one or more ROs.

Clause 16: The method of any one of Clauses 14-15, wherein the association period is determined based on the first set of ROs.

Clause 17: The method of any one of Clauses 14-16, wherein the association period is determined based on the second set of ROs.

Clause 18: The method of any one of Clauses 14-17, further comprising transmitting an indication that activates or deactivates, within a time period, one or more ROs of the second set.

Clause 19: The method of Clause 18, wherein the time period comprises at least one of: a physical RACH (PRACH) configuration period, the association period, or an association pattern period.

Clause 20: The method of Clause 18, wherein: the indication comprises a bitmap that indicates activated or deactivated ROs of the second set; and the bitmap indicates only valid ROs that are activated or deactivated.

Clause 21: The method of Clause 18, wherein the indication indicates a set of beams for mapping to one or more ROs of the second set that were added via the adaptation.

Clause 22: The method of Clause 18, further comprising determining validity or invalidity of ROs of the second set, wherein the determination of the association period is further based on the determined validity or invalidity of ROs of the second set.

Clause 23: The method of Clause 22, wherein ROs that were muted via the adaptation are considered as invalid.

Clause 24: The method of Clause 23, wherein the determination of the association period is further based on a rule that SSBs are only mapped to ROs considered as valid.

Clause 25: The method of any one of Clauses 14-24, wherein the network entity monitors for the RACH preamble in an RO in a time duration that does not fit in an association pattern period.

Clause 26: The method of Clause 25, wherein the network entity monitors for the RACH preamble in an RO that was added via the adaptation.

Clause 27: An apparatus, comprising: at least one memory comprising executable instructions; and at least one processor configured to execute the executable instructions and cause the apparatus to perform a method in accordance with any combination of Clauses 1-26.

Clause 28: An apparatus, comprising means for performing a method in accordance with any combination of Clauses 1-26.

Clause 29: A non-transitory computer-readable medium comprising executable instructions that, when executed by at least one processor of an apparatus, cause the apparatus to perform a method in accordance with any combination of Clauses 1-26.

Clause 30: A computer program product embodied on a computer-readable storage medium comprising code for performing a method in accordance with any combination of Clauses 1-26.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a graphics processing unit (GPU), a neural processing unit (NPU), a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, "a processor," "at least one processor" or "one or more processors" generally refers to a single processor configured to perform one or multiple operations or multiple processors configured to collectively perform one or more operations. In the case of multiple processors, performance of the one or more operations could be divided amongst different processors, though one processor may perform multiple operations, and multiple processors could collectively perform a single operation. Similarly, "a memory," "at least one memory" or "one or more memories" generally refers to a single memory configured to store data and/or instructions, multiple memories configured to collectively store data and/or instructions.

In some cases, rather than actually transmitting a signal, an apparatus (e.g., a wireless node or device) may have an interface to output the signal for transmission. For example, a processor may output a signal, via a bus interface, to a radio frequency (RF) front end for transmission. Accordingly, a means for outputting may include such an interface as an alternative (or in addition) to a transmitter or transceiver. Similarly, rather than actually receiving a signal, an apparatus (e.g., a wireless node or device) may have an interface to obtain a signal from another device. For example, a processor may obtain (or receive) a signal, via a bus interface, from an RF front end for reception. Accordingly, a means for obtaining may include such an interface as an alternative (or in addition) to a receiver or transceiver.

Means for receiving, means for determining, means for transmitting, and means for monitoring may comprise one or more processors, such as one or more of the processors described above with reference to FIG. 15.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Software shall be construed broadly to mean instructions, instruction sets, code, code segments, program code, programs, subprograms, software modules, applications, software applications, software packages, routines, subroutines, objects, executables, threads of execution, procedures, or functions, whether referred to as software, firmware, middleware, microcode, hardware description language, or otherwise.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An apparatus for wireless communication at a user equipment (UE), comprising:

at least one memory comprising computer-executable instructions; and one or more processors configured to execute the computer-executable instructions and cause the apparatus to:

receive signaling indicating adaptation of a first set of one or more random access channel (RACH) occasions (ROs), wherein the adaptation results in a second set of one or more ROs, wherein the adaptation adds one or more ROs and the second set of ROs includes the first set of ROs and the one or more ROs added by the adaptation;

determine an association period in which each synchronization signal block (SSB), of a set of SSBs, are mapped to at least one RO of the second set of ROs, wherein the association period is determined based on the second set of ROs; and transmit a RACH preamble in an RO of the second set, in accordance with the determined association period.

2. The apparatus of claim 1, wherein the adaptation of the one or more ROs comprises at least one of:

adding one or more ROs, or muting one or more ROs.

3. The apparatus of claim 1, wherein the association period is determined based on the first set of ROs.

4. The apparatus of claim 1, wherein the association period is determined based on the second set of ROs.

5. The apparatus of claim 1, wherein:

the signaling comprises first signaling that configures a set of ROs;

ROs from the configured set of ROs are mapped to SSBs; and the signaling further comprises second signaling that deactivates one or more of the configured set of ROs mapped to certain SSBs.

6. The apparatus of claim 1, wherein:

the signaling comprises first signaling that configures a set of ROs and second signaling that activates or deactivates, within a time period, one or more ROs of the configured set of ROs; and the RACH preamble is transmitted in one of the activated ROs.

7. The apparatus of claim 6, wherein the time period comprises at least one of:

a physical RACH (PRACH) configuration period, the association period, or an association pattern period.

8. The apparatus of claim 6, wherein:

the second signaling comprises a bitmap that indicates activated or deactivated ROs of at least one of the first set or the second set; and the bitmap indicates only valid ROs that are activated or deactivated.

9. The apparatus of claim 6, wherein the indication indicates a set of beams for mapping to one or more ROs of the second set that were added via the adaptation.

10. The apparatus of claim 6, wherein the one or more processors are further configured to execute the computer-executable instructions and cause the apparatus to determine validity or invalidity of ROs of the second set, wherein the determination of the association period is further based on the determined validity or invalidity of ROs of the second set.

11. The apparatus of claim 10, wherein ROs that were muted via the adaptation are considered as invalid.

12. The apparatus of claim 11, wherein the determination of the association period is further based on a rule that SSBs are only mapped to ROs considered as valid.

13. The apparatus of claim 1, wherein:

one or more of the association periods form an association pattern period within a larger interval; and the RACH preamble is transmitted in an RO in a time duration between an end of the association pattern period and an end of the larger interval.

14. The apparatus of claim 13, wherein the RACH preamble is transmitted in an RO that was added via the adaptation.

15. An apparatus for wireless communication at a network entity, comprising:

at least one memory comprising computer-executable instructions; and one or more processors configured to execute the computer-executable instructions and cause the apparatus to:

transmit signaling indicating adaptation of a first set of one or more random access channel (RACH) occasions (ROs), wherein the adaptation results in a second set of one or more ROs, wherein the signaling comprises first signaling that configures a set of ROs and second signaling that activates or deactivates, within a time period, one or more ROs of the configured set of ROs;

determine an association period in which each synchronization signal block (SSB), of a set of SSBs, are mapped to at least one RO of the second set of ROs; and monitor for a RACH preamble in an RO of the second set, in accordance with the determined association period, wherein the RACH preamble is monitored for in one of the activated ROS.

16. The apparatus of claim 15, wherein the adaptation of the one or more ROs comprises at least one of:

adding one or more ROs, or muting one or more ROs.

17. The apparatus of claim 15, wherein the association period is determined based on the first set of ROs.

18. The apparatus of claim 15, wherein the association period is determined based on the second set of ROs.

19. The apparatus of claim 15, wherein:

the adaptation adds one or more ROs;

the second set of ROs includes the first set of ROs and the one or more ROs added by the adaptation; and the association period is determined based on the second set of ROs.

20. The apparatus of claim 15, wherein:

the signaling comprises first signaling that configures a set of ROs;

ROs from the configured set of ROs are mapped to SSBs; and the signaling further comprises second signaling that deactivates one or more of the configured set of ROs mapped to certain SSBs.

21. The apparatus of claim 15, wherein the time period comprises at least one of:

a physical RACH (PRACH) configuration period, the association period, or an association pattern period.

22. The apparatus of claim 15, wherein:

the second signaling comprises a bitmap that indicates activated or deactivated ROs of at least one of the first set or the second set; and the bitmap indicates only valid ROs that are activated or deactivated.

23. The apparatus of claim 15, wherein the indication indicates a set of beams for mapping to one or more ROs of the second set that were added via the adaptation.

24. The apparatus of claim 15, wherein the one or more processors are further configured to execute the computer-executable instructions and cause the apparatus to determine validity or invalidity of ROs of the second set, wherein the determination of the association period is further based on the determined validity or invalidity of ROs of the second set.

25. The apparatus of claim 24, wherein ROs that were muted via the adaptation are considered as invalid.

26. The apparatus of claim 25, wherein the determination of the association period is further based on a rule that SSBs are only mapped to ROs considered as valid.

27. A method for wireless communication at a user equipment (UE), comprising:

receiving signaling indicating adaptation of a first set of one or more random access channel (RACH) occasions (ROs), wherein the adaptation results in a second set of one or more ROs, wherein the adaptation adds one or more ROs and the second set of ROs includes the first set of ROs and the one or more ROs added by the adaptation;

determining an association period in which each synchronization signal block (SSB), of a set of SSBs, are mapped to at least one RO of the second set of ROs, wherein the association period is determined based on the second set of ROs; and transmitting a RACH preamble in an RO of the second set, in accordance with the determined association period.

28. A method for wireless communication at a network entity, comprising:

transmitting signaling indicating adaptation of a first set of one or more random access channel (RACH) occasions (ROs), wherein the adaptation results in a second set of one or more ROs, wherein the signaling comprises first signaling that configures a set of ROs and second signaling that activates or deactivates, within a time period, one or more ROs of the configured set of ROs;

determining an association period in which each synchronization signal block (SSB), of a set of SSBs, are mapped to at least one RO of the second set of ROs; and monitoring for a RACH preamble in an RO of the second set, in accordance with the determined association period, wherein the RACH preamble is monitored for in one of the activated ROs.

* * * * *